United States Patent [19]
Franz et al.

[11] 4,025,846
[45] May 24, 1977

[54] CAPACITIVE SENSOR

[75] Inventors: Hans-Jürgen Franz, Schopfheim; Werner Rottmar, Lorrach, both of Germany

[73] Assignee: Endress & Hauser Gmbh & Co., Maulburg, Germany

[22] Filed: Oct. 6, 1975

[21] Appl. No.: 620,083

[30] Foreign Application Priority Data
Mar. 28, 1975  Germany .......................... 2448205

[52] U.S. Cl. .......................... 324/61 P; 73/304 C; 340/244 C; 361/281
[51] Int. Cl.² ..................................... G01R 27/26
[58] Field of Search .................... 324/61 P, 61 R; 73/304 C; 317/246; 340/200, 244 C; 258 C

[56] References Cited
UNITED STATES PATENTS 2,785,374  3/1957  Fay et al. ..................... 324/61 R X
2,910,940  11/1959  Colman et al. ............... 324/61 R X
2,950,601  8/1960  Wightman ......................... 324/61 P FOREIGN PATENTS OR APPLICATIONS
1,071,656  6/1967  United Kingdom ............. 324/61 R

*Primary Examiner*—Stanley T. Krawczewicz
*Attorney, Agent, or Firm*—Pollock, Vande Sande & Priddy

[57] ABSTRACT

A capacitive sensor for detecting variations of an electric field surrounding the sensor and produced by an electronic circuit connected to it, resulting when the probe is approached or covered by a solid or fluid medium. A pot-shaped, metallic sensor electrode is fitted within a hollow, closed body member of insulating material. A thin conductor is connected to the electrode and extends longitudinally through the body member, the space between the conductor and the interior walls of the body member being filled by air.

7 Claims, 4 Drawing Figures

CAPACITIVE SENSOR

This invention relates to a capacitive sensor for detecting variations of an electric field surrounding the sensor and produced by an electronic circuit connected to it, which result when the probe is approached or covered by a solid or fluid medium, including an insulated sensor electrode, the alteration in the capacitance between the sensor electrode and a reference electrode being made use of to provide an indication or to initiate a switching operation.

Capacitive sensors of this kind are used particularly for detecting limiting conditions in bunkers, silos and other receptacles, they may however also find application for other purposes, for example for capacitive proximity fuses or in alarm installations.

Capacitive sensors hitherto employed for determining the state of filling of a receptacle usually consist of a rod-like or tubular metal member, which is introduced into but insulated from the receptacle. The part of the sensor extending into the receptacle is often partly or wholly surrounded by a sheath of plastic material. When the receptacle is empty, there may then be measured at the connection to the sensor an electrical capacitance dependent upon the length and diameter of the metal member, as well as upon the manner in which it is mounted in the receptacle. As the contents of the receptacle approach the sensor, the capacitance measurable at the sensor connection increases in accordance with the dielectric constant of the contents; this increase in capacitance may be determined in an electronic evaluating circuit and used to provide an indication of the attainment of a particular state of filling and/or for initiating a switching operation, for example by energizing a relay. The sensitivity of the sensor depends upon the ratio of the change in capacitance to the initial capacitance. To obtain a high sensitivity it is therefore desirable to have as low as possible an initial capacitance and as large as possible a change in capacitance upon the approach of the contents.

With the known rod or tube-shaped sensor elements the disadvantage arises than an undesired increase in the capacitance occurs due to accumulation of the contained material at the position at which the sensor member is introduced into the container. As a result, a response of the electronic evaluation circuit may be caused, so that filling of the container may be simulated though it has not really occurred. To avoid this disadvantage, use has been made of capacitive sensors which include a screening sheath in the region where the sensor element is led through the container wall, which is connected to earth on the container and prevents any accumulation of contents in the region of the sensor element entry from giving rise to an increase in the sensed capacitance. This arrangement, however, introduces the disadvantage that the metallic shielding sheath increases the initial capacitance of the sensor element, so that the maximum change in capacitance which appears on the approach of the contained material is reduced, particularly for contained materials of very low dielectric constant, which makes necessary much more sensitive and therefore more expensive evaluation circuitry.

In a capacitive sensor of the kind initially set forth, as described in German published patent application No. 1673,841, in order to avoid the effects of deposits of the contained material there are provided, in addition to the sensor electrode, the change in capacitance of which initiates the commencement or cessation of oscillation of an oscillator, a shielding electrode connected in antiphase to the oscillator and an electrode connected to earth. This requires not only a complicated construction of the capacitive sensor, but also an expensive evaluation circuit.

The object of the invention is to provide a capacitive sensor of the kind initially set forth, which is of very simple construction and has a very low initial capacitance, and on the approach of a substance which is itself of low dielectric constant yields a relatively large change in capacitance at the sensor terminal, and in which especially the formation of deposits on the sensor has no disadvantageous effect.

According to the present invention there is provided a capacitive sensor element comprising a sensor electrode formed by a metal member arranged within the closed end of a hollow body member of insulating material, the extent of said metal member in the longitudinal direction of said body member being substantially less than the length of said body member, said electrode being arranged to be connected to a circuit responsive to changes in the capacitance between the sensor electrode and a reference electrode by way of an electrical conductor extending longitudinally within said sensor body member and which is very thin in comparison with the internal cross-sectional dimension of the sensor body member, the space between said conductor and the inner walls of said body member being occupied by air.

In a capacitive sensor constructed in accordance with the invention, the very small thickness of the connecting lead as compared with the cross-section of the sensor body, in conjunction with the fact that the space between the connecting lead and the wall of the sensor body is filled with air, gives the effect that the accumulation of any deposit on the part of the sensor body behind the sensor electrode results in only a very small increase, negligible as regards the measurement of the initial capacitance, measured at the sensor terminal, but yields a large change in capacitance as the substance to be sensed approaches or covers the part of the sensor body containing the sensor electrode. It is therefore possible, with a sensor so constructed, using an evaluation circuit of low cost, to obtain an exact determination of fluid or solid substances.

A sensor in accordance with the invention has the further advantage that it is of small mechanical size, is completely encased in insulating material and possesses great mechanical stability. The hollow sensor body may consist of plastics material, glass or a ceramic material, so that it is resistant to hostile substances.

If the sensor is intended for determining the state of filling of a container, the sensor being introduced through an aperture in the wall of the container, it is advantageously constructed so that the sensor body has a projection extending towards the interior of the container, to the end surface of which the sensor electrode is fitted, and so that the extent of the sensor electrode in the longitudinal direction of the sensor body is less than the length of the projection.

In an advantageous construction of a sensor in accordance with the invention, the sensor electrode is a pot-shaped metal member with a bottom arranged parallel with the end surface of the sensor body and side walls extending along the inner wall of the sensor body. This construction yields the same advantageous characteristics independently of whether the sensor is arranged vertically or horizontally, so that the sensor may also be built into the side wall of a container at any desired height.

An embodiment of the invention will be described with reference to the drawings, in which.

Figure 1:
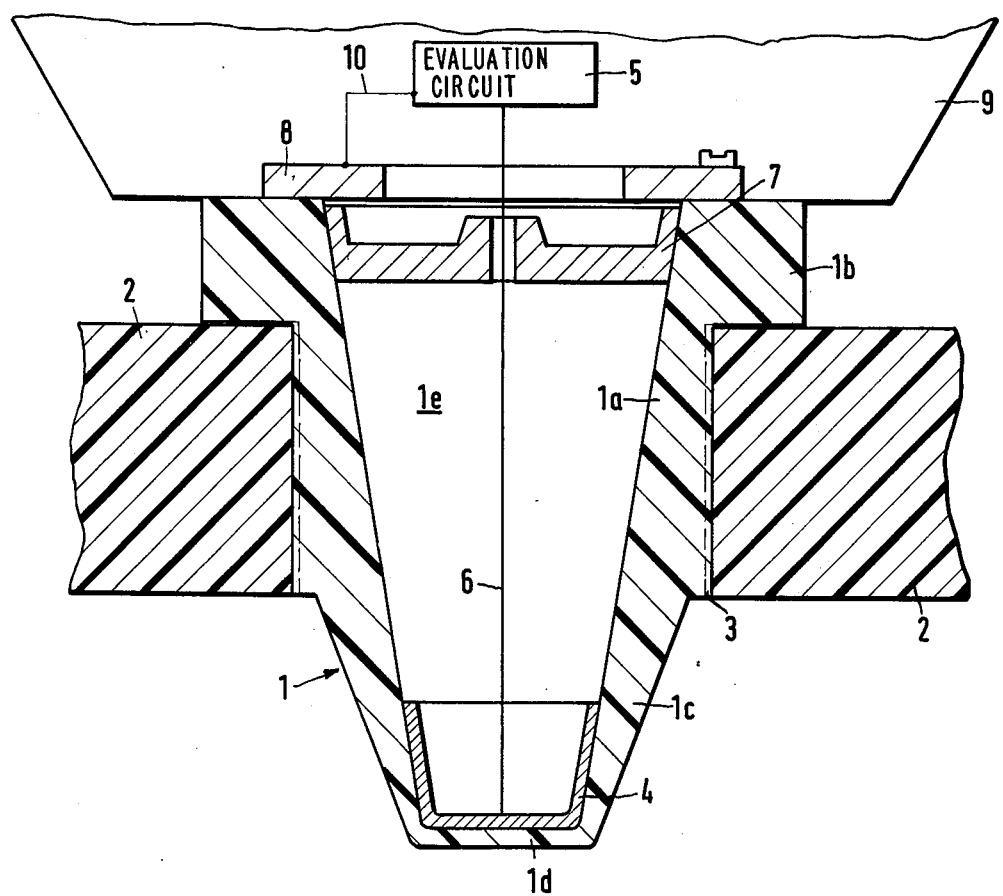
FIG. 1 is a schematic sectional elevation of a capacitive sensor in accordance with the invention.

the capacitive sensor shown in FIG. 1 is arranged to determine when a particular state of filling of a container is reached. It comprises a hollow sensor body member 1 of generally cylindrical form and made of an insulating material, for example of plastic material, glass or ceramic material. In order to be fitted sealingly to a container 2, the body member 1 has a cylindrical portion 1a, formed with an external screw thread 3 that screws into a mating internal screw thread formed in an aperture in container 2. The portion 1b of the sensor body member 1 lying outside the container is formed as a hexagon, while inwardly of the cylindrical portion 1a the body member is provided with a frusto-conical portion 1c which projects into the interior of the container. This projection 1c is closed at its narrow end by a thin end wall 1d. The hollow space 1e within the sensor body tapers in the form of a conical frustum from outside to inside the container.

Against the end wall 1d and within the container is applied a metallic sensor electrode 4. The sensor electrode has the form of a metal disc with a somewhat upwardly drawn margin, so that it is pot-shaped, the bottom of the pot being applied to the end wall 1d and the side walls to the frusto-conical inner surface of the sensor body. The side walls of the pot extend only about half the length of the projection 1c, so that a substantial part of the projection 1c is free from the sensor electrode. The extent of the sensor electrode 4 in the longitudinal direction (i.e., in the vertical direction in FIG. 1) is thus substantially less than the length of the sensor body 1 and also substantially less than the length of the projection 1c. The sensor electrode may be pressed into the sensor body 1 or, if the sensor body consists of plastic material, is preferably molded into the body.

The sensor electrode 4 is connected with an evaluation circuit 5 situated outside the sensor body 1 by way of a conductor 6 of which the diameter is very small as compared with the internal diameter of the sensor body 1, so that the capacitance between this connecting conductor and its surroundings is negligibly small and is practically dependent only upon its length. The connecting conductor 6 is preferably formed by a thin copper or steel wire, which is connected to the sensor electrode 4 by soldering or welding or by an adhesive. The wire 6 runs coaxially with the sensor body 1 through its hollow internal space 1e. Otherwise the space 1e is empty, so that only air is situated between the wire 6 and the walls of the sensor body 1.

The outer end of the internal space 1e of the sensor body 1 is closed by a head member 7 which is pierced by the wire 6. The head member 7 is formed so that the connecting conductor is guided centrally therein and tightly stretched.

On to the external end face of the sensor body 1 is screwed an annular metal ring 8, which also connects the casing 9 of the evaluation circuit with the sensor body. The metal ring 8 is held by way of a lead 10 at the reference potential of the evaluation circuit 5.

The evaluation circuit 5 is so constructed that it responds to alterations of the capacitance between the sensor electrode 4 and a reference electrode and initiates a switching operation, for example by energizing a relay, when this capacitance reaches a predetermined value.

If the sensor is built into a container the containing wall 2 of which consists of a non-conductive material, the metal ring 8 represents the reference electrode. When it is built into a metal container, the container wall 2 forms the reference electrode.

With the container empty, a certain capacitance exists between the sensor electrode 4 and the reference electrode. When during filling of the container the contained material approaches the sensor, this capacitance alters in accordance with the dielectric constant of the contained material, and when a definite value of capacitance is reached, the evaluation circuit 5 responds, so that it either generates a signal or initiates a switching operation, which for example prevents the introduction of further material into the container. The sensor is built into the container at a height corresponding to the desired state of filling.

Figure 2:
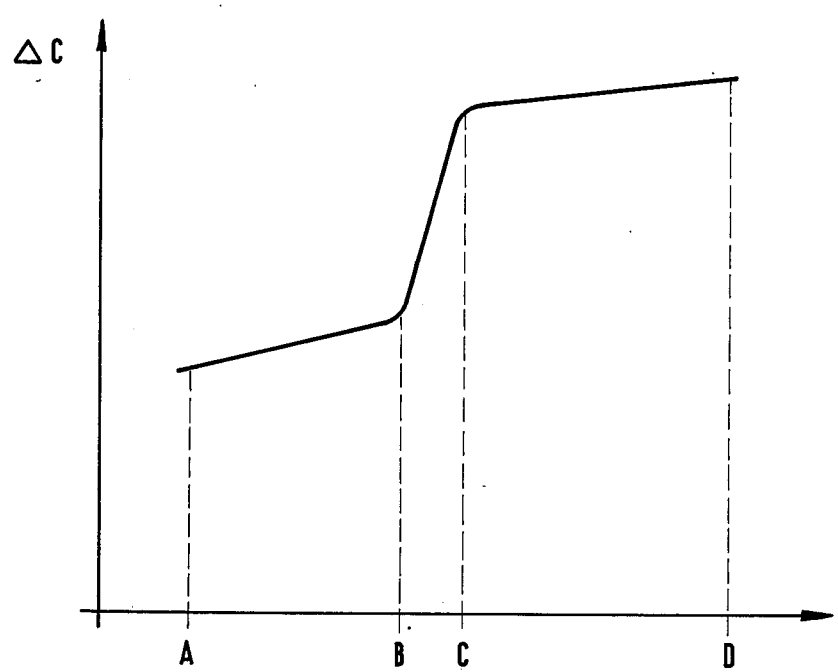
FIG. 2 is a graph showing the change in capacitance of the sensor described in relation to FIG. 1 in accordance with the state of filling of a container in which it is mounted.
Figure 3:
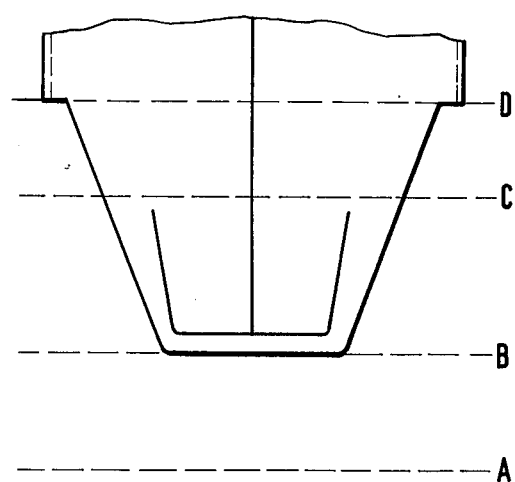
FIG. 3 is a diagram showing the different states of filling referred to in FIG. 2.

In the graph shown in FIG. 2 the change $\Delta C$ in the capacitance of the sensor electrode is plotted against the filling condition for the case when the sensor is mounted vertically as in FIG. 1, the points A, B, C and D marked on the abscissa corresponding to the filling conditions represented in FIG. 3. It may be seen that, as the contained material approaches the end wall of the sensor between filling conditions A and B, the capacitance changes only slowly, that between state B, when the contained material just touches the end surface of the sensor, and the state C when the part of the sensor containing the sensor electrode 4 is covered, a much greater rise in capacitance occurs, and that on further raising the filling level up to level D a relatively slower rise in capacitance again results. The steep rise in capacitance between filling states B and C makes possible an accurate response of the evaluation circuit within a relatively narrow range. Because of the small alteration of capacitance between the points C and D, on the contrary, an accumulation of the contained material in this region of the sensor body 1 results in only a very small increase in the initial capacitance of the sensor as measured at the sensor terminal, which may be neglected in the measurement. This advantageous effect arises because the connecting lead 6 is very thin and the space between the connecting lead 6 and the sensor body 1 is filled with an air dielectric.

The pot-shaped construction of the sensor electrode 4 provides the advantage that, even when the sensor is mounted with its axis horizontal, a relatively great increase in capacitance takes place only when the contained material rises into the vicinity of the sensor electrode 4. It is thus possible to mount sensors of similar construction not only vertically in an upper wall of the container, but also horizontally in the side wall of the container at any desired height.

Figure 4:
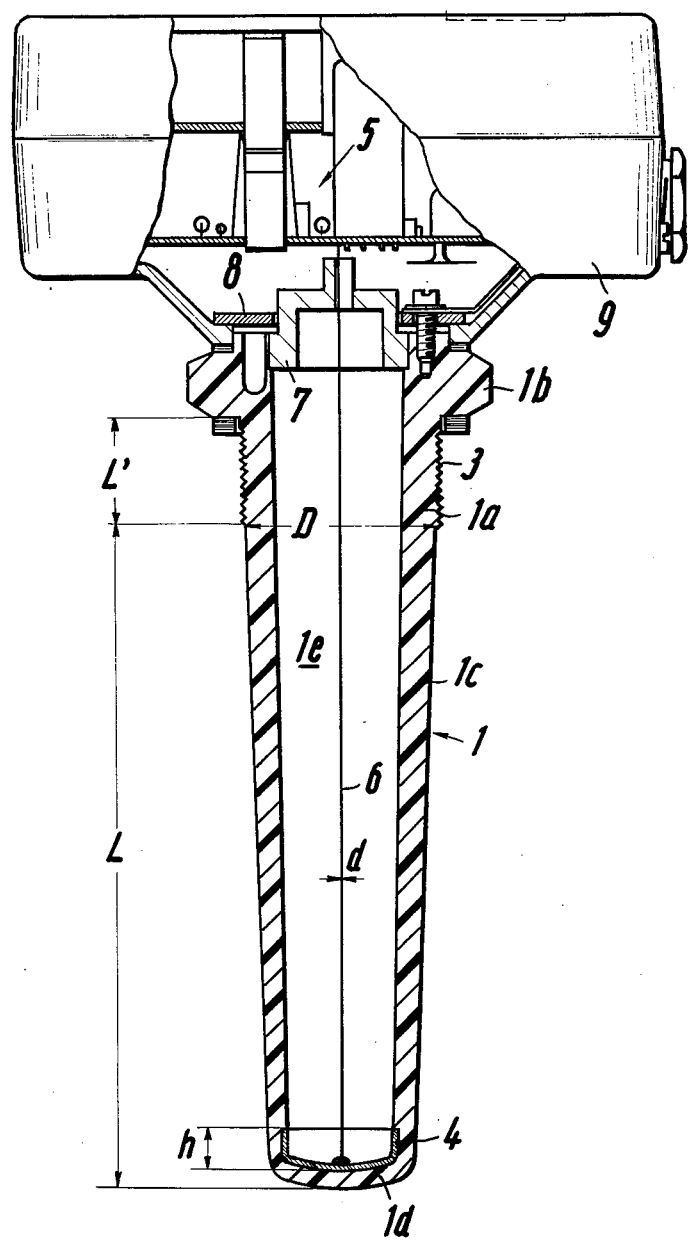
FIG. 4 is a sectional elevation of a practical embodiment of the sensor according to the invention.

A practical embodiment of the capacitive sensor in accordance with the invention is shown in FIG. 4, in which the same reference numbers as in FIG. 1 have been used to designate identical parts. In this practical embodiment the dimensions indicated in FIG. 4 have the following values:

| | |
|---|---|
| length L of projection 1c: | 150 mm |
| length L' of threaded portion 1a: | 25 mm |
| maximum outer diameter D of projection 1c: | 45 mm |
| diameter d of wire 6: | 0.4 mm |
| extent h of sensor electrode 4: | 9 mm |

Thus, in this embodiment the ratio of the outer diameter D of the sensor body member 1 to the diameter d of the wire 6 has an average value of about 100, and the ratio of the length L of the projection 1c to the extent h of the sensor electrode 4 in the longitudinal direction of the body member 1 is approximately 16.5.

The numerical values indicated above are, of course, given by way of example only. In preferred practical embodiments of the capacitive sensor according to the invention, these numerical values might be comprised within the following ranges:

| | | |
|---|---|---|
| length L of projection 1c: | 100 to | 600 mm |
| extent h of sensor electrode 4: | 5 to | 35 mm |
| outer diameter D of sensor body 1: | 40 to | 60 mm |
| diameter d of wire 6: | 0.2 to | 1 mm | and the following ratios should preferably be observed:

| | |
|---|---|
| ratio of length L of projection 1c to extent h of sensor electrode 4: | from 5 to 20 |
| ratio of outer diameter D of sensor body member 1 to diameter d of wire 6: | from 50 to 250 |

What we claim is:

1. A capacitive sensor element arranged to respond to a predetermined state of filling of a container, comprising a hollow body member of insulating material secured in an aperture in a wall of said container and having a portion projecting into the interior of said container and closed by an end wall, a pot-shaped metal member arranged within said body member and having a flat bottom portion abutting said end wall and side walls abutting the inner surface of the side walls of said body member, the extent of said pot-shaped metal member in the longitudinal direction of said body member being substantially less than the length of said body member, and an electrical conductor electrically connected to said pot-shaped metal member and extending longitudinally within said body member, the cross-section of said electrical conductor being very small in comparison with the internal cross-section of said body member, and the space between said conductor and the inner walls of said body member being occupied by air.

2. A capacitive sensor element in accordance with claim 1, wherein said metal member is pressure fitted into said sensor body member.

3. A capacitive sensor element in accordance with claim 1, wherein said body member consists of a moldable insulating material and said metal member is molded to said body member.

4. A capacitive sensor element in accordance with claim 1, wherein said thin electrical conductor is a wire tightly stretched within said body member.

5. A capacitive sensor element in accordance with claim 4, including an insulating head member for closing the space within said body member at the end thereof remote from said metal member, said wire being led through said insulating head member.

6. A capacitive sensor element in accordance with claim 1, wherein at least said projecting portion of the body member has the external form of a truncated cone.

7. A capacitive sensor element in accordance with claim 6, wherein said body member includes a cylindrical portion contiguous with said frustro-conical portion and sealingly secured in said aperture.

* * * * *